United States Patent [19]

Iwashita

[11] Patent Number: 4,979,825
[45] Date of Patent: Dec. 25, 1990

[54] DEVICE FOR MEASURING OPTICAL FREQUENCY MODULATION CHARACTERISTICS

[75] Inventor: Katsushi Iwashita, Kanagawa, Japan

[73] Assignee: Nippon Telegraph and Telephone Corporation, Tokyo, Japan

[21] Appl. No.: 337,741

[22] Filed: Apr. 13, 1989

[30] Foreign Application Priority Data

Apr. 14, 1988 [JP] Japan .................................. 63-92783

[51] Int. Cl.$^5$ .............................................. G01B 9/02
[52] U.S. Cl. ..................................... 356/345; 356/349
[58] Field of Search .............................. 356/345, 349

[56] References Cited

U.S. PATENT DOCUMENTS 3,508,060 4/1970 Boykin .
4,759,627 7/1988 Thylen et al. ........................ 356/345

OTHER PUBLICATIONS

Fritsch et al., "Simple Circuit for Feedback Stabilization of a Single-Mode Optical Fiber Interferometer", Review Sci. Instrum., vol. 52, pp. 996–1000, 7/1981.

Primary Examiner—Davis L. Willis
Assistant Examiner—Matthew W. Koren
Attorney, Agent, or Firm—Cushman, Darby & Cushman

[57] ABSTRACT

A system for a Mach-Zender interferometer which eliminates amplitude modulation of the input light and determines the frequency modulation. Two photodetectors in series are used to receive two outputs of two arms of a Mach-Zender interferometer. The outputs of the photodetectors are summed. The path length difference is controlled by a heater which itself is controlled by a controller. The controller selectively controls the heater based on how much non-zero components are present in the output of the photodetectors.

5 Claims, 4 Drawing Sheets

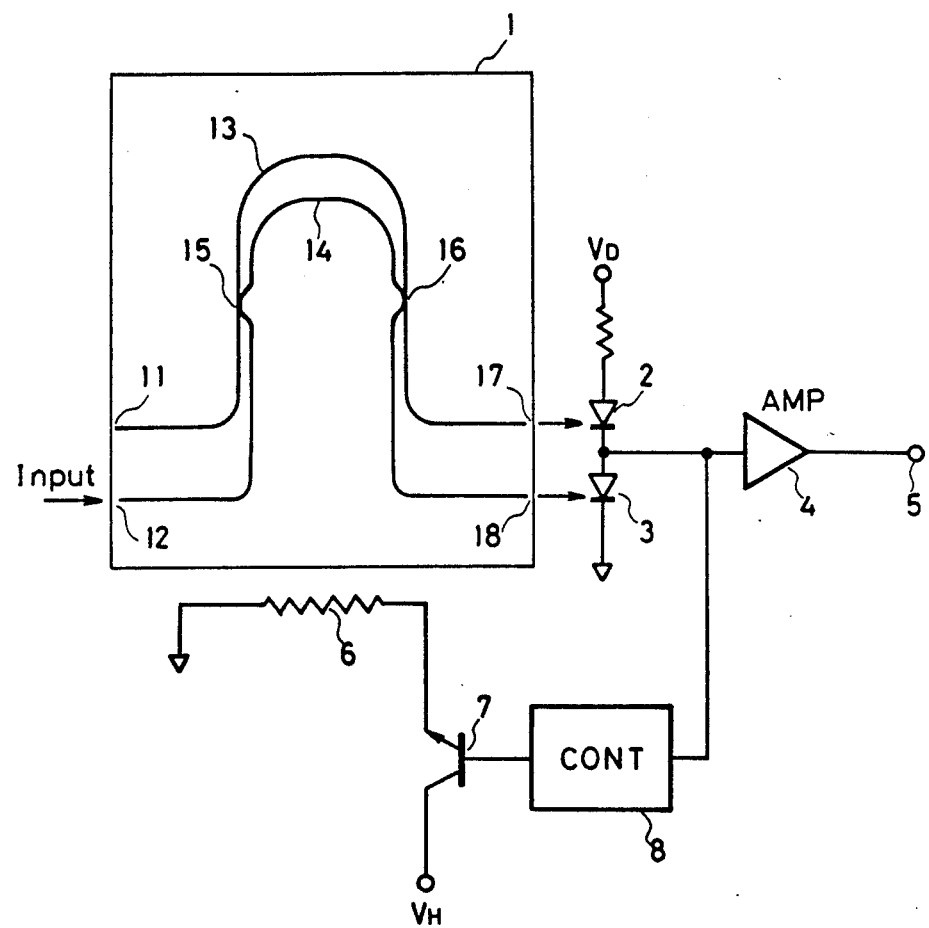
F I G. 1

DEVICE FOR MEASURING OPTICAL FREQUENCY MODULATION CHARACTERISTICS

BACKGROUND OF THE INVENTION

1. Field of the Invention

This invention is applicable to measurements made on optical communication equipment. More particularly, this invention is applicable to measurement of modulation characteristics of optical signals which have been modulated in frequency. This invention device is most suitable to measure modulation characteristics of optical signals for coherent light communications which have been emitted from a laser diode and modulated in frequency.

2. Prior Art of the Invention

Frequency modulation has been known as an effective method for coherent optical communications. Simple transmitters can be made by using frequency-modulated signals obtained by inputting modulation signals directly to the laser diode. Frequency-modulated signals obtained by directly modulating the laser diode, however, contain an amplitude modulation component as well as a frequency modulation component. Accurate measurement of the frequency modulation component requires a measurement method which is relatively independent of the influence of the spurious amplitude modulation component.

The frequency modulation response of the laser diode is influenced mainly by the frequency changes caused by the thermal effect at a low modulation frequency region, and mainly by the effect of the carrier in the high modulation region. The direction of frequency changes of these two effects, however, are opposite in sense to each other, and the frequency modulation response to injection current of the laser diode is accordingly not uniform. In order to measure the frequency modulation response of the laser diode, a circuit is required which can faithfully convert changes in frequency of optical signals into changes in voltage.

A Fabry-Perot etalon has conventionally been utilized for measurements of this type. A Fabry-Perot etalon is a device comprising two parallel plates, between which an object light is entered at an incident angle. An interference pattern is formed when the light is repeatedly reflected between the two parallel plates. If the distance d between the two plates and the angle $\theta$ are fixed, the interference pattern is determinable by the frequency of the incident light. Etalons which measure changes in frequency (or wavelength) of light by the interference pattern are widely known.

FIG. 5 is a characteristic graph which shows the relation between the input light frequency and the output light amplitude of such an etalon. The optical frequency is plotted on the horizontal axis while the optical power of the output light is plotted on the vertical axis. In other words, the graph shows a relationship between changes in intensity of the light which is outputted from the etalon, against frequency changes. If a point a at a large gradient of the characteristic curve is selected in the graph, and an incident light which has been modulated in frequency, with a center frequency fa of the point a, is given to an etalon, the optical signals in terms of changes in optical power are obtained as shown by the curve b in FIG. 5. The frequency modulation response can be measured by converting to voltage signals, with a photodetector, the optical signals which have already been converted to optical power change.

However, the above-mentioned instrumentation method has the following problems:

(1) As steep changes in frequency are limited, it cannot measure a wide frequency range;

(2) as it uses multiple reflections, propagation time difference between reflected waves and traveling waves prevents the measurement of frequency modulation response in a high frequency range; and (3) distortion occurs when the frequency deviation of input light is large.

Particularly, as to the first problem, a technique is known of varying the measurable frequency range by moving one of the reflective mirrors of the etalon or by changing the incident angle of the light, but the method needs an extremely precise and complicated mechanism.

Another method which conceivably causes interference patterns is the use of Mach-Zender interferometers. Although the Mach-Zender interferometer has an excellent response characteristic even in the high frequency range and shows gentle changes in optical power over a wider range of frequency of the input light, the light signals which have passed through a Mach-Zender interferometer are directly influenced by the amplitude changes of the input light. Therefore, the Mach-Zender interferometer has been regarded heretofore as not being suitable as an instrumentation device for separately measuring the frequency modulation component and the amplitude modulation component.

This invention was conceived in order to solve such problems encountered in the prior art and aims to provide an instrumentation device which can measure frequency modulation component over a wide frequency range and which has an extremely simple mechanism.

SUMMARY OF THE INVENTION

This invention device is characterized in that two photodetectors are provided to the two optical output ports of a Mach-Zender interferometer, and an electric circuit means is provided to output signals showing the difference of output signals between the two photodetectors.

This invention device is further characterized in that a means which controls the difference of the two optical path lengths of the interferometer is provided, and the means is controlled with input signals from a controller depending on the difference in said output electric signals. More preferably, it is controlled with input signals from the controller in a manner to make the time average of the difference zero. The difference in optical path lengths can be controlled by controlling the temperature of the paths.

Referring now to the schematic view in FIG. 2, the Mach-Zender interferometer herein comprises two input ports 11, 12, a first coupler 15 which reunites with interference the optical signals from two waveguides which respectively guide the input light from these input ports, two waveguides 13, 14 which guide the two optical signals respectively after they have been passed through the coupler and interfered with each other, a second coupler 16 which couples with interference the optical signals from said two waveguides, and two output ports 17, 18 which outputs the two optical signals which have interfered in the second coupler. A propagation time difference ($\tau$) is given in the optical path lengths of the two waveguides between the first and the second couplers.

Generally, when an optical signal is input at a first port 12 of the two input ports 11, 12, the optical signal is divided into two waveguides 13, 14 by the first coupler 15. The signals in the two waveguides propagate respectively with different propagation times and interfere with each other at the second coupler 16. This interference causes optical signals having an optical power which cyclically changes depending on the frequency of the input light signal, to be obtained at the two output ports 17, 18.

Optical power signals with opposite phases are obtained at the two optical output ports of the Mach-Zender interferometer, caused by the changes in frequency of input light. The effect of amplitude changes of input light appears with the same phase between the two optical output ports of the interferometer. Therefore, by subtracting the signals appearing at the two optical output ports, the out-of-phase amplitude changes are cancelled, and the in-phase frequency changes are doubled. Thus, the effect of the amplitude modulation of the input light can be cancelled, and the changes in optical power as against the frequency changes becomes doubled.

This method comprises the steps of receiving the optical outputs from the two output ports and obtaining the difference therebetween to cancel the amplitude change components to a certain extent. This will be explained by the equations below.

The signals at the input port 12 are expressed as below.

$$S(t) = A \cos\{wt + \phi(t)\} \tag{1}$$

wherein A denotes the electric field of the light, w denotes the angular frequency thereof (w being used in place of the conventional (omega)) and $\phi(t)$ denotes the frequency modulation signal.

The signals of the two waveguides 13, 14 of the interferometer are represented as follows:

$$S_1(t) = A \cos\{wt + \phi(t)\}/\sqrt{2} \tag{2}$$

$$S_2(t) = A \cos\{w(t - \tau) + \phi(t - \tau) + \pi/2)\}/\sqrt{2} \tag{3}$$

The signals $S_3$, $S_4$ at the two output ports 17, 18 are expressed as below:

$$S_3(t) = -A \times \cos[w\tau/2 = \{\phi(t) - \phi(t-\tau)\}/2] \cdot \times \sin[wt - w\tau/2 + \{\phi(t) + \phi(t-\tau)\}/2] \tag{4}$$

$$S_4(t) = -A \times \sin[w\tau/2 + \{\phi(t) - \phi(t-\tau)\}/2] \cdot \times \sin[wt - w\tau/2 + \{\phi(t) + \phi(t-\tau)\}/2] \tag{5}$$

As they are electric fields, they should be square-law-detected and then averaged to obtain the following equations.

$$S_5{}^2(t) = A^2 \times \cos^2[w\tau/2 + \{\phi(t) - \phi(t-\tau)\}/2]/2 \tag{6}$$

$$S_6{}^2(t) = A^2 \times \sin^2[w\tau/2 + \{\phi(t) - \phi(t-\tau)\}/2]/2 \tag{7}$$

If the path length different r is suitably adjusted to obtain the relation below:

$$w\tau = \frac{\pi}{2} + 2n\pi,$$

the equations below will hold.

$$S_5{}^2(t) = A^2[1 - \sin\{\phi(t) - \phi(t-\tau)\}]/4 \tag{8}$$

$$S_6{}^2(t) = A^2[1 + \sin\{\phi(t) - \phi(t-\tau)\}]/4 \tag{9}$$

In other words, if signals are received only at one of the two output ports, the device inevitably measures the optical power modulation component included in $A^2$. It will completely be removed by division, but in practice as the dividers cannot be made responsive to such a high speed, removal by division cannot be used for the measurement of high speed modulation characteristics. The different between both outputs can be expressed as below.

$$S_6{}^2(t) - S_5{}^2(t) = A^2 \sin\{\phi(t) - \phi(t-\tau)\}/2 \tag{10}$$

Then, the optical power modulation components included in the first terms of the equations (8) and (9) are removed. Although the components included in the second term remains even after the above processing, it is small enough to be negligible in usual measurements.

The frequency modulation signal $\phi(t)$ can be expressed by the equation below.

$$\phi(t) = \frac{\beta}{w_m} \cos(w_m t + \theta)$$

wherein $\beta$ denotes a modulation index, $w_m$ modulation angular frequency, and $\theta$ an arbitrary phase.

If they are substituted in the equation (10), the following relation holds.

$$S_6{}^2(t) - S_5{}^2(t) = \tag{11}$$

$$A^2(t)\sin\left[-\frac{2\beta}{w_m}\sin\frac{w_m\tau}{2} \times \sin\left(w_m\left(t - \frac{\tau}{2}\right) + \theta\right)\right]$$

Therefore, the relation below will hold:

$$\frac{w_m\tau}{2} < \frac{\pi}{2}$$

In other words, the optical propagation time difference $\tau$ must satisfy the relation expressed below; in order to detect the signals faithfully.

$$\tau < \frac{\pi}{w_m}$$

This invention provides a device which can measure the frequency modulation component of signals without influence from the amplitude modulation component by using the difference between the signals appearing at the two output ports of Mach-Zender interferometer as the measurement output.

BRIEF DESCRIPTION OF THE DRAWINGS

These and other advantages will now be discussed with reference to the accompanying drawings.

FIG. 1 is a structural view to show an embodiment of this invention.

DESCRIPTION OF THE PREFERRED EMBODIMENT

Figure 2:
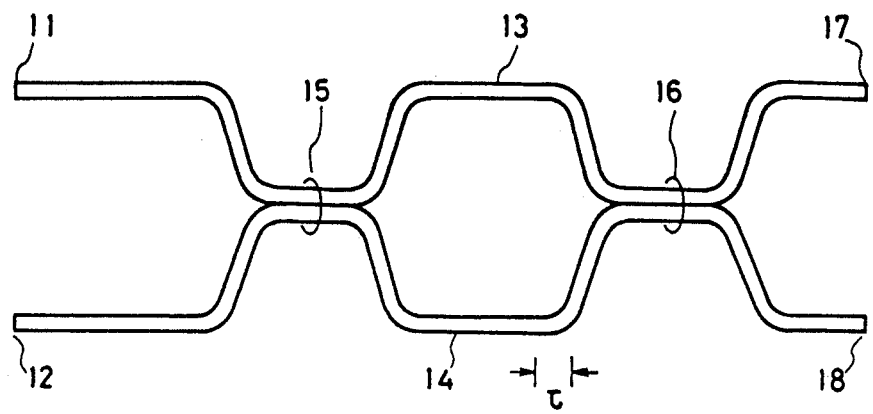
FIG. 2 is a schematic view to show a Mach-Zender interferometer.

FIG. 1 is a structural view of an embodiment of this invention. The device includes a Mach-Zender interferometer 1 to which the light to be measured is input after it has been frequency modulated, and photodetectors 2 and 3 which convert the optical power of the output light from the Mach-Zender interferometer i into electric signals. Two photodetectors are provided, respectively mounted at the two optical output ports of the interferometer. An electric circuit means outputs a difference between the output signals of the two photodetectors 2 and 3. The device is connected such that the two detectors 2 and 3 are in series, with the voltage of the anode of the photodetector 2 connected to the voltage of cathode of the photodetector 3. The difference in the output signals is transmitted to an output terminal 5 via an amplifier 4.

A heater 6 is provided in the Mach-Zender interferometer in order to control a difference between two optical path lengths, and a transistor 7 is provided to control the electric current through the heater 6. The transistor 7 has its control electrode connected to a controller 8 which provides a controlling input in accordance with the difference between the two output signals.

The Mach-Zender interferometer 1 comprises optical waveguides 13 and 14 formed on a silicon substrate. The reference numerals 11 and 12 denote optical input ports, 15 and 16 directional couplers, and 17 and 18 two optical output ports. The two optical waveguides 13 and 14 are designed to have lengths which differ in optical propagation time by $\tau$ from each other.

FIG. 2 is a schematic view of a Mach-Zender interferometer. As the lengths of the two optical waveguides 13 and 14 differ from each other in optical propagation time by $\tau$, the output light beam at the two output ports 17 and 18 interfere with each other. The interference changes based on the frequency.

Figure 3:
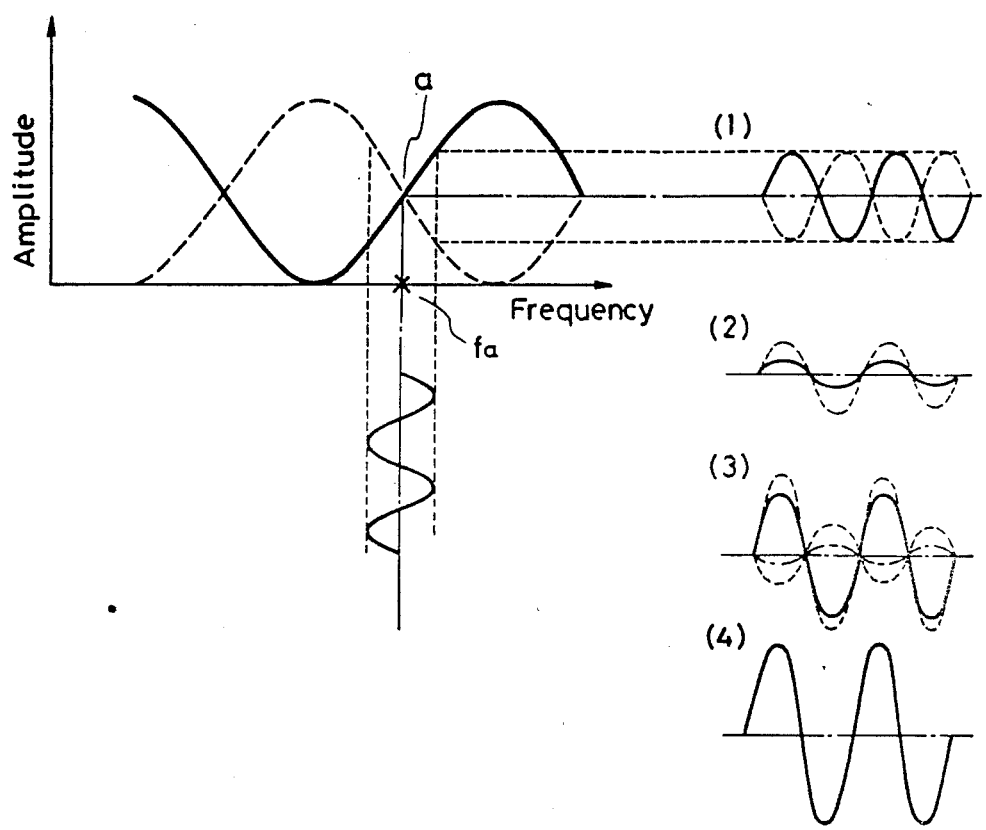
FIG. 3 is an explanatory chart of the operation of the embodiment of this invention.

FIG. 3 shows a relation between the frequency of the input light at the port 12, and amplitude output indicative of optical power at the two output ports 17 and 18. In the graph in FIG. 3, the solid line shows the characteristics of the output light from the port 17 while the broken line shows the characteristics of the output light from the port 18.

FIG. 3 shows a port which has a substantially similar gradient over the two curves being selected. An optical signal which has been modulated by a frequency mainly emitting at and having a center frequency of frequency fa, is given as an input at the port 12. The optical power at the output ports 17 and 18 will then change corresponding to the changes in frequency of the input light, as shown by the output signal labelled 3(1). The changes in optical power of the two light beams at the ports 17 and 18 are completely out-of-phase with one another. If the signals detected at the two ports 17 and 18 are subtracted from each other, therefore, the amplitude will become twice the level of either, as shown in FIG. 3(4).

If it is assumed that the input light is the frequency modulation signal obtained by directly modulating a laser diode, it includes not only a frequency modulation component but also an amplitude modulation component as explained in the background of the invention section. Moreover, the amplitude modulation components will be in-phase with each other. The effect of the amplitude changes included in the input light after the outputs at the ports 17 and 18, are shown as waves 3(2) and 3(3). Waves 3(2) and 3(3) show the solid line representing the small amplitude modulation component and the dot-and-dash line expressing the large amplitude modulation component. When the amplitude modulation component has the same phase as that of the amplitude component at the port 17 (as it will at the output of the interferometer), the optical amplitude at the port 17 may become larger as shown in wave 3(3) while that at port 18 becomes smaller. However, the cumulative effect of the two amplitude changes is cancelled by subtracting one of the signals detected at two ports 17 and 18 from the other, the final effect of which is shown as wave 3(4).

This embodiment is so structured that the optical paths will change effectively in accordance with the temperature controlled by the heater 6 to thereby vary the time $\tau$. This means that the signal representing the difference between the two photodetectors 2 and 3 will be given at the input of controller 8. Controller 8 may comprise a comparator or an operational amplifier which compares the input signal with zero volts, and a low-pass filter which integrates and passes the output from the comparator. The system is connected in a feedback loop such that the signals representing the difference approach an average voltage of zero. More specifically, a positive average voltage in controller 8 causes the value of current applied to the heater to be adjusted in a way to reduce this average voltage, and vice versa. This closed loop control of heater 6 adjusts the path length of the interferometer, to change the interference in a way to minimize the average voltage.

Therefore, even if the central frequency fa of the object signals shown in FIG. 3 fluctuates, point a will be compensated to follow the movement, and come to be positioned at the intersection of the solid line with the broken line.

Figure 4:
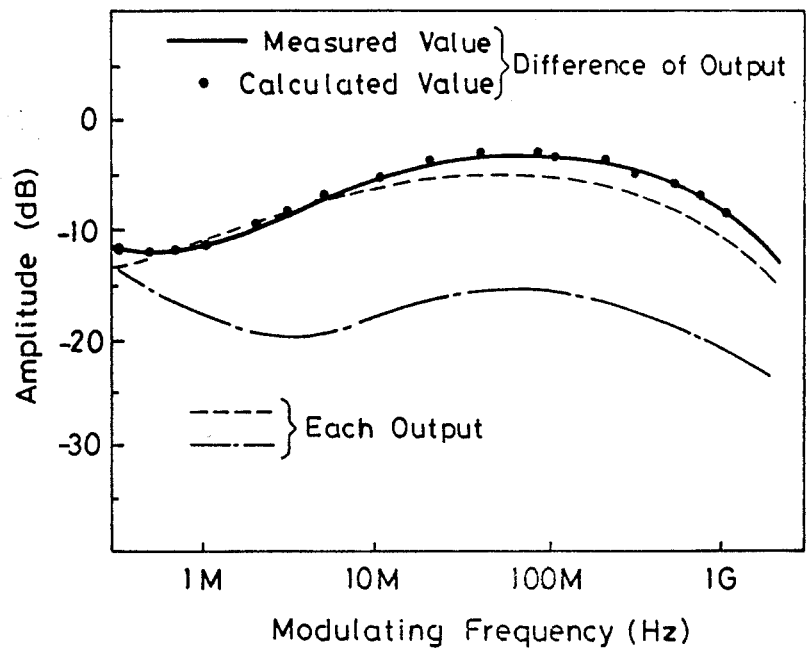
FIG. 4 is a graph to show an example of measurement conducted by this invention device.
Figure 5:
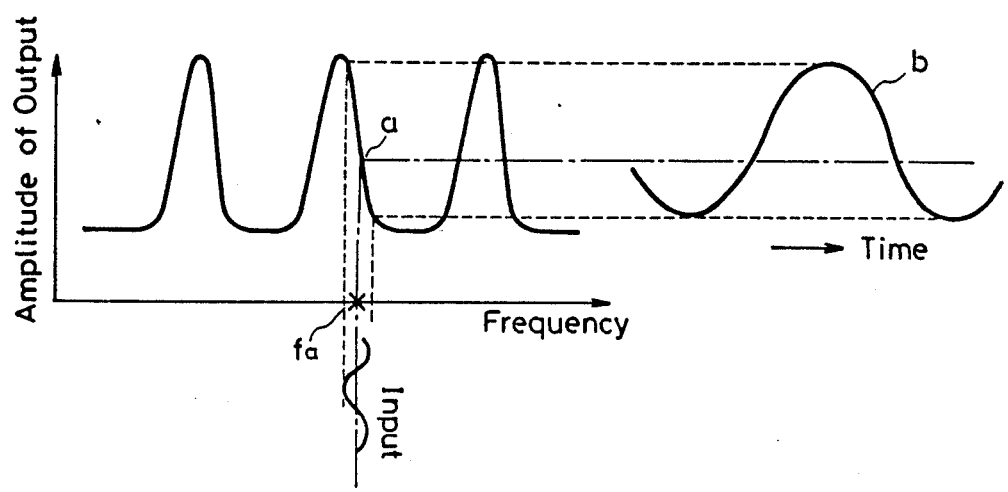
FIG. 5 is an explanatory chart of a prior art device operation.

FIG. 4 shows an example of a measurement result obtained by means of this embodiment device. The graph shows a result of the measurement of the levels of detected outputs or signals which represent the difference. The light has been modulated in frequency by a direct modulation of a laser diode, and the frequency plotted on the horizontal axis represents the modulating frequency. To facilitate comparison, the result of measurement of only one output light beam at an output port of the same Mach-Zender interferometer is shown in the graph, as compared with the measured light beams using two output ports. The values represented as filled circles are the calculated frequency modulation responses which are expected to appear. In the graph of FIG. 4, the curve represented with a dot-and-dash line has a frequency modulation component and an amplitude modulation component which have opposite phases to each other. Therefore, the measured amplitude is small as in curve 3(2). On the other hand, the curve expressed with broken lines has two components in the same phase. The result indicates that when only one of the outputs from the Mach-Zender interferometer is used, the frequency modulation component is not properly measured due to the effect of the amplitude modulation component included in the object signal. But when the difference between the output light from the two output ports is measured, the frequency modulation component alone can be separated and measured.

Although the above description relates to a Mach-Zender interferometer formed on a substrate, this invention is not limited to such arrangement. This invention may be realized by using other types of Mach-Zender interferometers which form an optical path in a space to have a similar effect. The effective length of an optical path may be controlled by various means other than the heating method used in the above description so far as it can control the length to embody this invention.

What is claimed is:

1. A measurement device for optical frequency modulation characteristics comprising:
   a Mach-Zender interferometer, formed with two paths of variable length and receiving light to be measured which has been frequency modulated as an input, and having two optical output ports;
   two photodetectors, one photodetector provided at each of said two optical output ports of said Mach-Zender interferometer, for converting an optical power of output light from said Mach-Zender interferometer into electric signals indicative thereof;
   electric circuit means for determining a difference between said electric signals from said two photodetectors and producing an output indicative thereof;
   path control means for controlling a difference between lengths of the two optical paths of the Mach-Zender interferometer; and
   controller means for controlling said path control means so as to make the average of the difference of said output electric signals approach zero;
   wherein said path control means includes means for producing a signal which has a level depending on whether an input signal is zero or not and filter means, coupled to said output of said producing means, for integrating an output of said producing means.

2. A measurement device for optical frequency modulation characteristics comprising:
   a Mach-Zender interferometer, formed with two paths of variable length and receiving light to be measured which has been frequency modulated as an input, and having two optical output ports;
   two photodetectors, one photodetector provided at each of said two optical output ports of said Mach-Zender interferometer, for converting an optical power of output light from said Mach-Zender interferometer into electric signals indicative thereof;
   electric circuit means for determining a difference between said electric signals from said two photodetectors and producing an output indicative thereof;
   path control means for controlling a difference between lengths of the two optical paths of the Mach-Zender interferometer; and
   controller means for controlling said path control means so as to make the average of the difference of said output electric signals approach zero;
   wherein said path control means comprises a heater, said controller means controlling a current supplied to said heater.

3. A measurement device for optical frequency modulation characteristics comprising:
   a Mach-Zender interferometer, formed with two paths of variable length, receiving light to be measured which has been frequency modulated as an input, and having two optical output ports;
   two photodetectors, one photodetector provided at each of said two optical output ports of said Mach-Zender interferometer, for converting an optical power of output light from said Mach-Zender interferometer into electric signals indicative thereof;
   electric circuit means for determining a difference between said electric signals from said two photodetectors and producing an output indicative thereof; and
   a heater for changing a path length of said Mach-Zender interferometer.

4. A device for measuring optical frequency modulation characteristics comprising:
   a Mach-Zender interferometer, having two optical paths, both receiving frequency modulated light to be measured as input, and having two output ports;
   two photodetectors, one provided at each said output port of each path of said Mach-Zender interferometer for producing electric signals indicative of light from said output port;
   means for determining a difference between said electric signals from said photodetectors and producing an output indicative thereof; and
   path control means for changing a difference between optical path lengths of the interferometer in a way to make said difference approach zero;
   wherein said path control means includes heater means for producing heat to change an optical path length, and means for controlling said heater means based on whether said output of said determining means is zero or not.

5. A device for measuring optical frequency modulation characteristics comprising:
   a Mach-Zender interferometer, having two optical paths, both receiving frequency modulated light to be measured as input, and having two output ports;
   two photodetectors, one provided at each said output port of each path of said Mach-Zender interferometer for producing electric signals indicative of light form said output port;
   means for determining a difference between said electric signals from said photodetectors and producing an output indicative thereof; and
   path control means for changing a difference between optical path lengths of the interferometer in a way to make said difference approach zero;
   wherein said controlling means includes a comparator for comparing said signal from said difference determining means with zero and a filter for integrating an output of said comparator.

* * * * *